Patented Feb. 27, 1951

2,543,636

UNITED STATES PATENT OFFICE 2,543,636

POLYMERIZATION IN THE PRESENCE OF DIBUTYL SULFITE AS AN ACCELERATOR

John A. Loritsch, Scotia, N. Y., assignor to General Electric Company, a corporation of New York No Drawing. Original application July 23, 1946, Serial No. 685,773. Divided and this application November 24, 1948, Serial No. 61,930

2 Claims. (Cl. 260—45.4)

This application is a division of my earlier filed application, Serial No. 685,773, filed July 23, 1946, and assigned to the same assignee as the present invention.

This invention relates to the polymerization of compounds containing polymerizable groupings. More particularly, this invention is concerned with a method of accelerating the rate of polymerization of a substantially non-aqueous polymerizable system containing an organic oxygen-releasing peroxide catalyst and a polymerizable compound capable of being polymerized by the aforementioned organic catalyst, e. g., a polymerizable compound containing a $CH_2=C<$ grouping or a $—CH=CH—$ grouping which method comprises incorporating in the said system a small amount of an organic reducing agent capable of being oxidized by the addition of an atom of oxygen released from the said organic catalyst, and thereafter effecting polymerization of the resulting mass.

In the polymerization of chemical compounds or compositions containing polymerizable groups or radicals of the type disclosed above (for brevity referred to hereinafter as "the polymerizable compounds"), it is often desired to accelerate the conversion of the monomeric material or, in some cases, a substantially unpolymerized material to the polymeric form or substantially polymerized state. For this purpose, catalysts are incorporated in the polymerizable mixture. However, despite the use, in some cases, of quite active catalysts, e. g., benzoyl peroxide, aluminum chloride, etc., it is often difficult to effect the accelerated polymerization without obtaining products having certain defects.

For instance, when benzoyl peroxide is employed as a catalyst for the polymerization of a polymerizable system containing an unsaturated aliphatic alcohol ester of a polycarboxylic acid, e. g., diallyl phthalate, and a polyhydric alcohol ester of an alpha unsaturated alpha, beta polycarboxylic acid (said polyhydric alcohol ester being often referred to as an "unsaturated alkyd resin"), e. g., diethylene glycol maleate, great care must be exercised in effecting the polymerization. If too large an amount of benzoyl peroxide is employed, the type of copolymer obtained will be inferior due to the low molecular weight of the product. If a small amount of benzoyl peroxide is employed, the time for effecting reaction is greatly extended. In addition, if the time for effecting polymerization is attempted to be decreased by heating the polymerizable mass at higher temperatures, quite often the polymerized product will contain bubbles, cracks, voids, etc.

I have now discovered that polymerizable systems of the kind mentioned in the first paragraph of this specification, more particularly such systems comprising polymerizable material containing a $CH_2=C<$ radical or a plurality of such radicals, or polymerizable material (other than, e. g., drying and semi-drying oils and acids thereof) containing a $—CH=CH—$ radical or plurality of such radicals, may be polymerized at a much faster rate than has heretofore been possible to produce polymerized products having an appearance and properties comparable to products polymerized for much longer periods of time in accordance with the better techniques now employed in the art.

In accordance with the practice of the more specific embodiments of my invention, I am able to effect more rapid conversion of the above-described polymerizable materials or compositions of matter to the finally polymerized state by incorporating in the polymerizable material (e. g., the polymerizable compound or compounds) a small amount of an organic oxygen-releasing peroxide catalyst, adding to the polymerizable system a small amount of an organic reducing compound as illustrated, e. g., by the following groups of compounds: (1) organic reducing compounds corresponding to the general formula

where R' is selected from the class of substituents consisting of organic hydrocarbon radicals, for instance, alkyl, aryl, alkaryl, aralkyl radicals, alkoxy, and aryloxy radicals, and R is the same as R' and in addition may be a substituent selected from the class consisting of hydrogen and hydroxy substituents; a more specific example of such class being organic compounds containing phosphorus and an oxygen atom attached directly to the phosphorus atom, e. g., organophosphorus compounds having the general formula

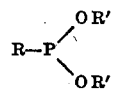

where R is an organic radical, e. g., a hydrocarbon radical, more particularly one selected from the class consisting of alkyl, aryl, alkaryl, and aralkyl radicals, and R' is a substituent selected from the class consisting of hydrogen and organic radicals which may be the same as R (supra); (2) organic reducing compounds containing sulfur and an oxygen attached directly to the sulfur, e. g., organosulfur compounds having the general formula $$RO-\overset{O}{\underset{\|}{S}}-OR'$$

where R and R' have the same meaning as disclosed above. One of the requirements for the above-disclosed organophosphorus and organosulfur compounds is that these compounds contain a phosphorus or sulfur atom the valence of which can be increased by the addition of an atom of oxygen released from the peroxide catalyst.

In practicing the present invention, it is essential that certain precautions be taken in the type of organic peroxide or type of organic reducing compound employed. For example, certain organic peroxide catalysts, for instance, benzoyl peroxide, exert no additional accelerating effect on the polymerization of the generically described polymerizable compounds (or compositions) when used in conjunction with the organic reducing agent of the type disclosed above when compared with the case where the organic reducing agent is absent. The reason for this is not clearly understood. However, one explanation for this may depend upon the manner in which benzoyl peroxide dissociates.

Benzoyl peroxide, for example, dissociates in the presence of a reducing agent of the type disclosed above according to the following equation:

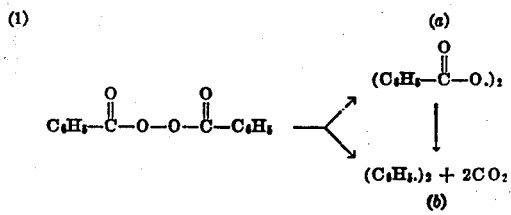

From the above manner in which benzoyl peroxide dissociates, it will be apparent that there is no oxygen released which is capable of oxidizing an organic reducing agent by an attachment of the oxygen to the reducing agent. The absence of oxygen in the dissociation (decomposition) of benzoyl peroxide is substantiated by the work of Hey and Walters as reported in Chem. Rev., 21, 169 (1937), and by McClure, Robertson and Cuthbertson as disclosed in Can. Journ. Res., 20B, 103 (1942).

When other organic peroxide compounds of the type employed in the practice of my invention are caused to dissociate, the reaction is believed to proceed as illustrated, e. g., by tertiary butyl hydroperoxide:

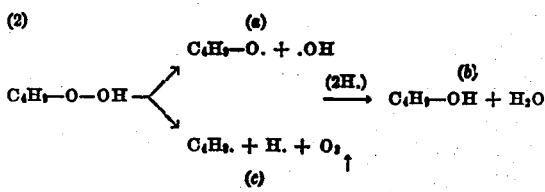

In the presence of the usual types of inhibitors, e. g., hydroquinone, the dissociation proceeds according to (a) and (b) of the above equation. This reaction is shown by the following equation:

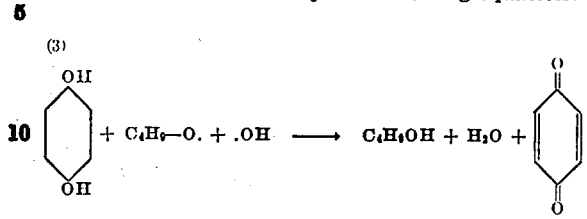

However, when teritary butyl hydroperoxide is used with the type of reducing agent employed in the practice of my invention, the reaction of this type of reducing agent, e. g., phenyl phosphinic acid, whose formula may be written as

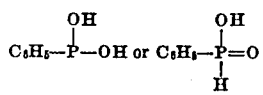

with tertiary butyl hydroperoxide proceeds according to (c) of Equation 2. Expressed by means of an equation, the reaction would appear as follows:

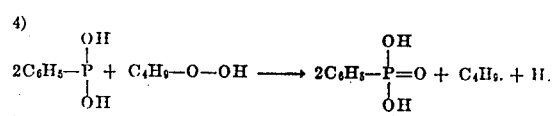

The free radicals when thus released in a reactive medium are believed to initiate polymerization which causes the polymerization to proceed at an accelerated rate.

Generally, in accordance with the practice of my invention, it is believed that all reducing agents which reduce by acquiring an atom of oxygen promote the acceleration effect. Those reducing agents which reduce by furnishing protons to another molecule, do not promote acceleration, but rather promote retardation of the polymerization. Stated alternatively, the acceleration effect is brought about by free radicals released by the reaction between the proper peroxide catalyst and the proper accelerator, the type of accelerator and peroxide used determining the effect produced.

My invention may be applied to the polymerization of various polymerizable monomers and mixtures of monomers. These include, e. g., the various polymerizable materials or monomers containing the $CH_2=C<$ grouping, for instance, styrene, substituted styrenes, e. g., dichlorostyrene, divinyl benzene, vinyl ethylbenzene, etc.; acrylic and methacrylic acids and derivatives thereof including the nitriles of the said acids, e. g., acrylonitrile, the amides of the said acids, e. g., acrylamide, esters of an acrylic acid of the general formula

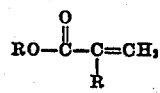

where R may be hydrogen and, in addition, may be a halogen or a hydrocarbon radical, more particularly one selected from the class consisting of alkyl, aryl, alkaryl, and aralkyl radicals, and R' may be a substituted (e. g., halogenated) or an unsubstituted hydrocarbon radical which may be the same as R, for example, ethyl acrylate, butyl acrylate, methyl methacrylate, propyl methacrylate, propyl alpha-chloroacrylate, benzyl acrylate, tolyl acrylate, chlorobenzyl acrylate, etc.; polyesters of acrylic acids, e. g. ethylene diacrylate, etc., allyl and methallyl ethers and allyl and methallyl esters of monocarboxylic and polycarboxylic saturated and unsaturated acids, both aliphatic (e. g., alkyl and alkenyl) and aromatic acids, e. g., vinyl allyl ether, diallyl phthalate, dimethallyl phthalate, diallyl tetrachlorophthalate, diallyl carbonate, diallyl maleate, allyl alloxyacetate, allyl acetate, diallyl succinate, etc.; vinyl ethers and esters, e. g., divinyl ether, vinyl esters of saturated and unsaturated aliphatic monocarboxylic and polycarboxylic acids, e. g., vinyl acetate, vinyl propionate, vinyl butyrate, divinyl oxalate, vinyl acrylate, vinyl crotonate, etc.; vinyl ketones, e. g., divinyl ketone, vinyl ethyl ketone, etc.; saturated and unsaturated monohydric and polyhydric alcohol esters of unsaturated polycarboxylic acids of the itaconic acid type, e. g., diethyl itaconate, diallyl itaconate, ethylene glycol itaconate, diethylene glycol itaconate, glyceryl itaconate, methyl citraconate, dimethallyl citraconate, diethyl mesaconate, diallyl mesaconate, etc.; vinyl halide compounds, e. g., vinyl chloride, vinyl bromide, etc.; diolefin compounds, e. g., butadiene-1,3, 2-methyl butadiene-1,3 chloroprene, 2-cyanobutadiene-1,3, etc.

Among the compounds containing a

grouping which may be polymerized in accordance with the concept of my invention, are, e. g., saturated and unsaturated, monohydric and polyhydric alcohol esters of alpha unsaturated alpha, beta polycarboxylic acids, for instance, diethyl fumarate, diethyl maleate, dibutyl fumarate, ethylene glycol maleate, ethylene glycol fumarate, propylene glycol maleate, diethylene glycol maleate, propylene glycol fumarate, glyceryl maleate, diallyl maleate, diallyl fumarate, dimethallyl maleate, etc. It will be understood by those skilled in the art, that mixtures of compounds containing $CH_2=C<$ grouping and the —CH=CH— grouping may also be employed as the polymerizable materials Various suitable reducing agents may be employed which in the presence of the proper organic peroxide catalyst accelerate the polymerization of the above-described polymerizable compounds. These include, e. g., organic compounds containing a phosphorus atom to which an oxygen atom is attached directly to the phosphorus atom, the valence of which can be increased by the addition of an oxygen atom released from the organic oxygen-releasing peroxide catalyst, for instance, alkyl phosphinic acids, e. g., butyl phosphinic acid, etc.; aryl phosphinic acids, e. g., phenyl phosphinic acid; dialkyl hydroxy phosphines, e. g., diethyl hydroxy phosphine; diaryl hydroxy phosphines, e. g., diphenyl hydroxy phosphine, etc.; alkyl aryl phosphinates, e. g., dibutyl phenyl phosphinate; aryl alkyl phosphinates, e. g., diphenyl butyl phosphinate, etc.; diaryl aryl phosphinates, e. g., diphenyl phenyl phosphinate, etc.; alkyl and aryl phosphites, e. g., phenyl phosphite, etc.; organic reducing compounds containing a sulfur atom to which an oxygen atom is attached directly to the sulfur atom, the valence of which can be increased by the addition of an oxygen atom released from the organic oxygen-releasing peroxide catalyst, e. g., alkyl and aryl sulfites, for instance, alkyl sulfites, e. g., ethyl sulfite, n-butyl sulfite, aryl sulfites, e. g., phenyl sulfite, etc. The foregoing compounds are only illustrations of the broad class of compounds which can be employed as accelerators within the broad scope of my claimed invention. It is, of course, understood, that mixtures of the above-mentioned reducing agents (accelerators) may also be employed.

The amount of reducing agent employed may be varied depending on such factors as, e. g., the type of polymerizable materials employed, reaction products desired, temperature conditions, etc. Usually the amount, by weight, may be varied from about 0.01 to 10 per cent of the weight of the polymerizable materials. I prefer to employ from about 0.1 to 4 or 5 per cent, since no particular advantage is obtained by using amounts substantially in excess of these amounts.

As was stated previously not all organic peroxides are suitable for use in the practice of my invention. Only those organic peroxides which can be induced to give up an atom of oxygen in the presence of the organic reducing agent, many examples of which have been given above, may be used. These include dialkyl peroxides, alkyl hydroperoxides, alkyl esters of peracids, and mixed aliphatic and aromatic peroxides all of which give up an atom of oxygen in the presence of the organosulfur reducing agent described above, e. g., acetyl benzoyl peroxide, isopropyl tertiary butyl peroxide, tertiary butyl hydroperoxide, diheptanol, tertiary butyl perbenzoate, ditertiary butyl diperphthalate, tertiary butyl perfuroate, ditertiary butyl diperadipate, ditertiary butyl dipersuccinate, 1-hydroxy cyclohexyl hydroperoxide-1, tertiary amyl hydroperoxide, diacetyl peroxide, etc, as well as other suitable aliphatic (e. g., alkyl), aromatic or mixed aliphatic and aromatic (e. g., mixed alkyl aryl) peroxides, peracids, hydroperoxides, peracid esters, etc. The amount of organic oxygen-releasing peroxide catalyst employed may also be varied over a wide range depending, for example, on the polymerizable materials employed, products desired, temperature conditions, etc. Usually I may employ from about 0.1 to as high as 8 or 10 per cent by weight of the polymerizable materials. I prefer to employ an amount of the organic peroxide catalyst equal to from 0.25 to about 5 per cent, by weight, of the polymerizable materials.

In order that those skilled in the art may better understand how the present invention may be practiced, the following examples are given by way of illustration and not by way of limitation. All parts are by weight.

*Example 1*

In this example diallyl phthalate and diethylene glycol maleate were copolymerized in varying proportions using different organic peroxide catalysts employed in the practice of my invention, and phenyl phosphinic acid as the organic reducing agent exemplifying the type disclosed previously. To determine the accelerating effect obtained using the concept embodied in my invention, each polymerizable system was allowed to stand at room temperature until it was determined that the mixture had gelled. The time required to arrive at this gel stage was taken as the "Average time to gel at room temperature." All parts are by weight.

| Sample No. | Diallyl Phthalate | Diethylene Glycol Maleate | Catalyst | Phenyl Phosphinic Acid | Average Time To Gel at Room Temp. |
|---|---|---|---|---|---|
| | Parts | Parts | | Parts | Hours |
| 1 | 67 | 33 | Benzoyl peroxide, 1 part | None | 120 |
| 2 | 67 | 33 | ----do---- | 2 | 160 |
| 3 | 67 | 33 | Diheptanol peroxide, 1 part | None | About 340 |
| 4 | 67 | 33 | ----do---- | 2 | 1 |
| 5 | 50 | 50 | Tertiary butyl perbenzoate, 1.5 parts | None | 50 |
| 6 | 50 | 50 | ----do---- | 1.5 | 4 |
| 7 | 50 | 50 | Ditertiary Butyl Diperphthalate, 1.5 parts | None | 55 |
| 8 | 50 | 50 | ----do---- | 1.5 | 4 |
| 9 | 50 | 50 | Tertiary Butyl Perfuroate, 1.5 parts | None | 79 |
| 10 | 50 | 50 | ----do---- | 1.5 | 5 |
| 11 | 50 | 50 | Ditertiary Butyl Diperadipate, 1.5 parts | None | 55 |
| 12 | 50 | 50 | ----do---- | 1.5 | 7 |
| 13 | 50 | 50 | Ditertiary Butyl Dipersuccinate, 1.5 parts | None | 85 |
| 14 | 50 | 50 | ----do---- | 1.5 | 12 |
| 15 | 67 | 33 | 1-hydroxy cyclohexyl hydroperoxide-1, 1 part | None | 300 |
| 16 | 67 | 33 | ----do---- | 1 | 12 |
| 17 | 67 | 33 | Tertiary amyl hydroperoxide, 1 part | None | 320 |
| 18 | 67 | 33 | ----do---- | 1 | 12 |
| 19 | 50 | 50 | Diacetyl, 1.5 parts | None | 20 |
| 20 | 50 | 50 | ----do---- | 2 | 3 |
| 21 | 50 | 50 | Acetyl benzoyl peroxide, 1.5 parts | None | 20 |
| 22 | 50 | 50 | ----do---- | 2 | 6 |
| 23 | 50 | 50 | Ditertiary butyl peroxide, 1.5 parts | None | 90 |
| 24 | 50 | 50 | ----do---- | 1.5 | 94 |
| 25 | 50 | 50 | None | None | 96 |
| 26 | 50 | 50 | None | 2 | Greater than 1080 |

Example 2

This example illustrates the results obtained by polymerizing a mixture of polymerizable materials comprising diallyl phthalate and diethylene glycol maleate in the presence of tertiary butyl hydroperoxide and using various reducing agents, including reducing agents which are known to be inhibitors per se for the polymerization of the aforementioned polymerizable materials.

for 15 hours at 110° C. In every sample except the one in which phenyl phosphinic acid was absent, gelling occurred after the 20 hours at room temperature. The "Remarks" in the following table are concerned only with the appearance of the castings after heating at the elevated temperature (110° C.).

| Sample No. | Parts Diallyl Phthalate | Parts Diethylene Glycol Maleate | Parts Catalyst | Accelerator | Average Time To Gel At Room Temp., In Hours |
|---|---|---|---|---|---|
| 1 | 67 | 33 | 1 | None | 340. |
| 2 | 50 | 50 | 1 | None | 216. |
| 3 | 50 | 50 | 1.5 | None | 144. |
| 4 | 50 | 50 | 1 | Tertiary Butyl catechol, 2 parts | Greater than 384. |
| 5 | 50 | 50 | 1 | Guaiacol, 2 parts | Do. |
| 6 | 50 | 50 | 1 | Quinone, 2 parts | Do. |
| 7 | 67 | 33 | 1 | Phenyl phosphinic acid, 2 parts | 12. |
| 8 | 67 | 33 | 1 | n-Butyl sulfite, 2 parts | 12. |
| 9 | 67 | 33 | 1 | Diphenyl hydroxy phosphine, 2 parts | 60. |
| 10 | 50 | 50 | 1.5 | Diphenyl phenyl phosphinate, 1 part | 5. |
| 11 | 100 | 100 | Benzoyl Peroxide 6 | None | 67. |
| 12 | 100 | 100 | ----do---- | n-Butyl sulfite, 3 parts | 72. |

Example 3

This example illustrates the advantage which can be taken of being able to polymerize materials, e. g., a mixture of diallyl phthalate and diethylene glycol maleate, at a faster rate and still obtain products which have better properties than those of products obtained by effecting polymerization of the same materials in omitting the accelerating system embodied in my invention. In each case the polymerizable materials were placed in a glass tube and examined for gelling properties at the end of 20 hours at room temperature. Thereafter each sample was heated

| Sample No. | Parts Diallyl Phthalate | Parts Diethylene Glycol Maleate | Parts Tertiary Butyl Hydroperoxide | Parts Phenyl Phosphinic Acid | Remarks |
|---|---|---|---|---|---|
| 1 [1] | 134 | 66 | 2 | None | Very hard, many cracks. |
| 2 | 134 | 66 | 2 | 2 | Very hard, two large cracks. |
| 3 | 134 | 66 | 2 | 3 | Very hard, two small cracks. |
| 4 | 134 | 66 | 2 | 3.5 | Very hard, no cracks. |
| 5 | 134 | 66 | 2 | 5 | Do. |
| 6 | 134 | 66 | 2 | 6 | Do. |

[1] This sample showed no signs of gelling after 20 hours at room temperature while all the other samples were already gelled at that time.

Example 4

This example demonstrates that other polymerizable systems may be copolymerized in accordance with my claimed invention to obtain acceleration of the polymerization of such systems.

| Sample No. | Polymerizable Composition | Peroxide Catalyst | Accelerator | Time To Gel At Room Temp., In Hours |
|---|---|---|---|---|
| 1 | Styrene, 40 parts; Propylene glycol, fumarate-carbate,[1] 60 parts. | Tertiary butyl hydroperoxide, 2 parts. | None | 14. |
| 2 | Same as 1 | Same as 1 | Phenyl Phosphinic acid, 2 parts. | 0.5. |
| 3 | Butyl methacrylate, 33 parts; Castor oil vinalkyd,[2] 67 parts. | Same as 1 | None | 45. |
| 4 | Same as 3 | Same as 1 | Same as 2 | 2. |
| 5 | Diallyl phthalate, 100 parts | Tertiary butyl perbenzoate, 2 parts. | None | 8.35 minutes.[3] |
| 6 | Same as 5 | Same as 5 | Same as 2 | 5.4 minutes.[3] |
| 7 | Methyl methacrylate, 100 | Tertiary butyl perbenzoate, 3 parts. | 0 | 96. |
| 8 | Same as 7 | Same as 7 | Phenyl Phosphinic acid, 3 parts. | 24. |
| 9 | Methyl methacrylate, 100 parts | do | n-butyl sulfite, 3 parts. | 18. |
| 10 | Styrene, 33.4 parts; Diethylene glycol maleate, 66.6 parts. | do | 0 | 96. |
| 11 | Same as 10 | do | Same as 9 | 18. |
| 12 | Vinyl acetate, 100 parts | do | 0 | Greater than 330 hours. |
| 13 | Same as 12 | do | Same as 8 | Greater than 330 hr. However, the viscosity was about 25 times that of sample 12 after 330 hours. |

[1] Prepared by effecting reaction between 33 mols propylene glycol, 1 mol fumaric acid, and 2 mols carbic anhydride.
[2] Prepared by effecting reaction (with heat) between 81 parts castor oil and 17.2 parts maleic anhydride. After cooking to an acid value of about 100-111, decarboxylation is effected by the addition of 1.8 parts pyridine and further heating. (See Agens patent U. S. 2,404,204.)
[3] The gelling times in these two cases were determined at 132.2° C.

It will be understood by those skilled in the art that the invention is not intended to be limited to include the specific polymerizable materials, or organic peroxide catalysts, or accelerators, i. e., reducing agents, employed in the foregoing examples. Other polymerizable materials, organic peroxide catalysts, and accelerators as mentioned previously (supra) may also be employed in place of the ones used in the foregoing examples. It will be apparent, also, that the benefits derived at the temperatures employed in the foregoing examples are obtainable, though more pronounced, at higher temperatures, e. g., at 80° to 150° C.

By means of my invention, it is possible to polymerize the aforementioned polymerizable materials in situ in shorter periods of time than has heretofore been possible, while at the same time the possibility of the development of voids, cracks, etc., in the polymerized piece is minimized. This is especially useful in the case of castings and moldings of such materials which are used, e. g., as dielectrics for capacitors, as bushings, in potting and sealing applications, or for other electrical insulation purposes.

Advantage may also be taken of the accelerated rate of polymerization in other manufacturing procedures. For example, I may use the liquid form of the polymerizable materials containing one of the above-described oxygen-releasing peroxides and accelerators for coating compositions, or as cohesive ingredients in laminates. Since many of the polymerizable compositions are liquids and require no solvent, these compositions can be employed for coating or impregnating applications wherein it is possible to polymerize quite readily the entire impregnating or coating composition without the use of solvents. In addition, because of the ability to gel the polymerizable compositions so readily by means of my claimed invention, it is now economically feasible to employ the gelled materials for molding compositions by grinding the gelled particles and molding the same under heat and pressure.

Even though solventless mixtures of the polymerizable materials may be employed for coating or other purposes specified previously, solution of the polymerizable mass in suitable solvents may also be effected to yield mixtures having decreased viscosities suitable, e. g., for deposition on objects in thin films. Such solutions may be used for wire coatings and other types of insulation including heat and electrical insulation, as acid and alkali-resistant impregnants, etc.

It will, of course, be understood that the polymerizable compositions disclosed and claimed in this invention may be modified further by including fillers, opacifiers, pigments, etc.

What I claim as new and desire to secure by Letters Patent of the United States is:

1. The method of polymerizing a non-aqueous polymerizable system free of unsaturated oils and drying oil acids and containing diallyl phthalate and diethylene glycol maleate, which method comprises carrying out the polymerization in the presence of (a) tertiary butyl hydroperoxide and (b) n-butyl sulfite.

2. A composition free of water and unsaturated drying oils and drying oil acids, said composition comprising the product of reaction of a mixture of ingredients comprising (1) a mixture of diallyl phthalate and diethylene glycol maleate, (2) tertiary butyl hydroperoxide, and (3) from 0.01 to 5 per cent, by weight, based on the weight of (1), of n-butyl sulfite.

JOHN A. LORITSCH.

REFERENCES CITED

The following references are of record in the file of this patent:

UNITED STATES PATENTS

| Number | Name | Date |
|---|---|---|
| 2,382,812 | Parker | Aug. 14, 1945 |
| 2,462,354 | Brubaker et al. | Feb. 22, 1949 |
| 2,515,686 | Barnes et al. | July 18, 1950 |